(12) United States Patent
Hillier

(10) Patent No.: US 11,955,674 B1
(45) Date of Patent: Apr. 9, 2024

(54) USE OF A FUEL CELL TO DECARBONIZE A HYDROCARBON CRACKING SYSTEM

(71) Applicant: Chevron Phillips Chemical Company LP, The Woodlands, TX (US)

(72) Inventor: James Hillier, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/179,979

(22) Filed: Mar. 7, 2023

(51) Int. Cl.
| | |
|---|---|
| *H01M 8/0612* | (2016.01) |
| *B01J 6/00* | (2006.01) |
| *C01B 3/34* | (2006.01) |
| *C10G 47/00* | (2006.01) |
| *H01M 8/04089* | (2016.01) |
| *H01M 8/0662* | (2016.01) |
| *H01M 8/0668* | (2016.01) |

(52) U.S. Cl.
CPC ............ *H01M 8/0618* (2013.01); *B01J 6/00* (2013.01); *C01B 3/34* (2013.01); *C10G 47/00* (2013.01); *H01M 8/04097* (2013.01); *H01M 8/0668* (2013.01); *H01M 8/0681* (2013.01); *C01B 2203/0233* (2013.01); *C01B 2203/065* (2013.01); *C01B 2203/066* (2013.01); *C10G 2300/4043* (2013.01)

(58) Field of Classification Search
CPC ........... H01M 8/0618; H01M 8/04097; H01M 8/0668; H01M 8/0681; C01B 2203/0233; C01B 3/34; C10G 47/00; B01J 6/00
See application file for complete search history.

(56) References Cited

U.S. PATENT DOCUMENTS

| | | | |
|---|---|---|---|
| 3,000,989 A | * | 9/1961 | Compostella ............ C10G 9/00 585/921 |
| 3,773,655 A | * | 11/1973 | Stolfa .................. C10G 49/007 208/108 |
| 5,232,793 A | | 8/1993 | Miyauchi |
| 6,130,260 A | | 10/2000 | Hall |
| 6,323,247 B1 | | 11/2001 | Hall |
| 6,432,565 B1 | | 8/2002 | Haines |
| 6,602,920 B2 | | 8/2003 | Hall |
| 7,119,240 B2 | | 10/2006 | Hall |
| 7,208,647 B2 | | 4/2007 | Peterson |
| 9,077,006 B2 | | 7/2015 | Berlowitz |

(Continued)

FOREIGN PATENT DOCUMENTS

DE 102021210194 A1 * 3/2023

OTHER PUBLICATIONS

Machine Translation of DE-102021210194-A1 (Sep. 5, 2023) (Year: 2023).*

*Primary Examiner* — Matthew J Merkling
(74) *Attorney, Agent, or Firm* — Scheef & Stone, LLP

(57) ABSTRACT

Processes and systems that utilize a fuel cell for carbon capture from a petrochemical stream that contains hydrogen and methane. The petrochemical stream can be the tail gas of a hydrocarbon cracking system, or any other petrochemical stream containing hydrogen and methane. The petrochemical stream can be separated into a hydrogen product stream and a methane product stream, before sending the methane product stream to the fuel cell. The fuel cell converts methane to carbon dioxide and hydrogen to water, while generating electricity that can be used to power equipment.

13 Claims, 5 Drawing Sheets

(56) References Cited

U.S. PATENT DOCUMENTS

| | | |
|---|---|---|
| 9,077,007 B2 | 7/2015 | Berlowitz |
| 9,362,580 B2 | 6/2016 | Berlowitz |
| 10,589,221 B2 | 3/2020 | Badgwell |
| 10,676,799 B2 | 6/2020 | Berlowitz |
| 11,043,684 B2 | 6/2021 | Jahnke |
| 2002/0125173 A1* | 9/2002 | Kuno ............... C10G 47/00 |
| | | 208/113 |
| 2005/0003247 A1 | 1/2005 | Pham |
| 2005/0137269 A1* | 6/2005 | Hershkowitz ....... C07C 29/1518 |
| | | 518/702 |
| 2006/0159967 A1 | 7/2006 | Huijsmans |
| 2008/0107932 A1* | 5/2008 | Pham ................. C01B 3/382 |
| | | 429/495 |
| 2013/0225885 A1* | 8/2013 | Foody ................ C10G 65/04 |
| | | 585/254 |
| 2016/0351930 A1* | 12/2016 | Jahnke ............... C25B 1/04 |

* cited by examiner

USE OF A FUEL CELL TO DECARBONIZE A HYDROCARBON CRACKING SYSTEM

FIELD OF THE DISCLOSURE

The present disclosure generally relates to the production of olefins in a hydrocarbon cracking system, and more particularly to reducing the carbon footprint of the hydrocarbon cracking system.

BACKGROUND

Furnaces are used in the petrochemical industry as well as other industries to supply heat for a particular application. In the petrochemical industry, an exemplary use of furnaces is in a hydrocarbon cracking system to produce an olefin from an alkane, such as ethylene from ethane. The heat in a furnace can be supplied by the combustion of a fuel gas that can contain hydrocarbons, and combustion of hydrocarbons in the furnace can produce a flue gas that contains carbon dioxide and water.

In an effort to reduce carbon dioxide emissions for these types of furnaces, the flue gas emitted from a furnace can be introduced to a carbon capture process, in which carbon dioxide is removed from the flue gas to produce a carbon dioxide product having a high concentration of carbon dioxide and a residual gas product that has a low concentration of carbon dioxide. The residual gas product can then be used or processed accordingly with reduced concern for carbon dioxide emissions.

There is a need to find other techniques to reduce carbon emissions from hydrocarbon cracking systems.

SUMMARY

Described herein is a process that includes: separating a first cracking product stream into a hydrogen-rich methane stream and one or more second cracking product streams; introducing the hydrogen-rich methane stream or a derivative product stream to an anode chamber of a fuel cell; introducing an oxygen-containing stream to a cathode chamber of the fuel cell, wherein the fuel cell has an assembly including an anode and a cathode that are separated by a separating element (e.g., a solid oxide element or a molten carbonate element); and converting, at the anode of the fuel cell, methane and hydrogen received from the hydrogen-rich methane stream or from the methane product stream to carbon dioxide and water to generate electricity.

Also described herein is a hydrocarbon cracking system that includes: a furnace having a conduit contained in an interior of the furnace; a first separator fluidly connected to an outlet of the conduit and configured to separate a first cracking product stream into a hydrogen-rich methane stream and one or more second cracking product streams; a second separator fluidly connected to the first separator and configured to separate the hydrogen-rich methane stream into a hydrogen product stream and a methane product stream; a fuel cell having an anode chamber, a cathode chamber, and an assembly including i) an anode, ii) a cathode, and iii) a separating element (e.g., a solid oxide element or a molten carbonate element) positioned between the anode and the cathode, wherein an inlet to the anode chamber is configured to receive the methane product stream, wherein the fuel cell is configured to convert, at the anode of the fuel cell, methane and hydrogen received from the methane product stream or a derivative product stream to carbon dioxide and water to generate electricity.

Also described herein is another hydrocarbon cracking system that includes: a furnace having a conduit contained in an interior of the furnace; a first separator fluidly connected to an outlet of the conduit and configured to separate a first cracking product stream into a hydrogen-rich methane stream and a second cracking product stream; a fuel cell having an anode chamber, a cathode chamber, and an assembly including i) an anode, ii) a cathode, and iii) a separating element (e.g., a solid oxide element or a molten carbonate element) positioned between the anode and the cathode, wherein an inlet to the anode chamber is configured to receive the hydrogen-rich methane stream, wherein the fuel cell is configured to convert, at the anode of the fuel cell, methane and hydrogen received from the hydrogen-rich methane stream or a derivative product stream to carbon dioxide and water to generate electricity.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
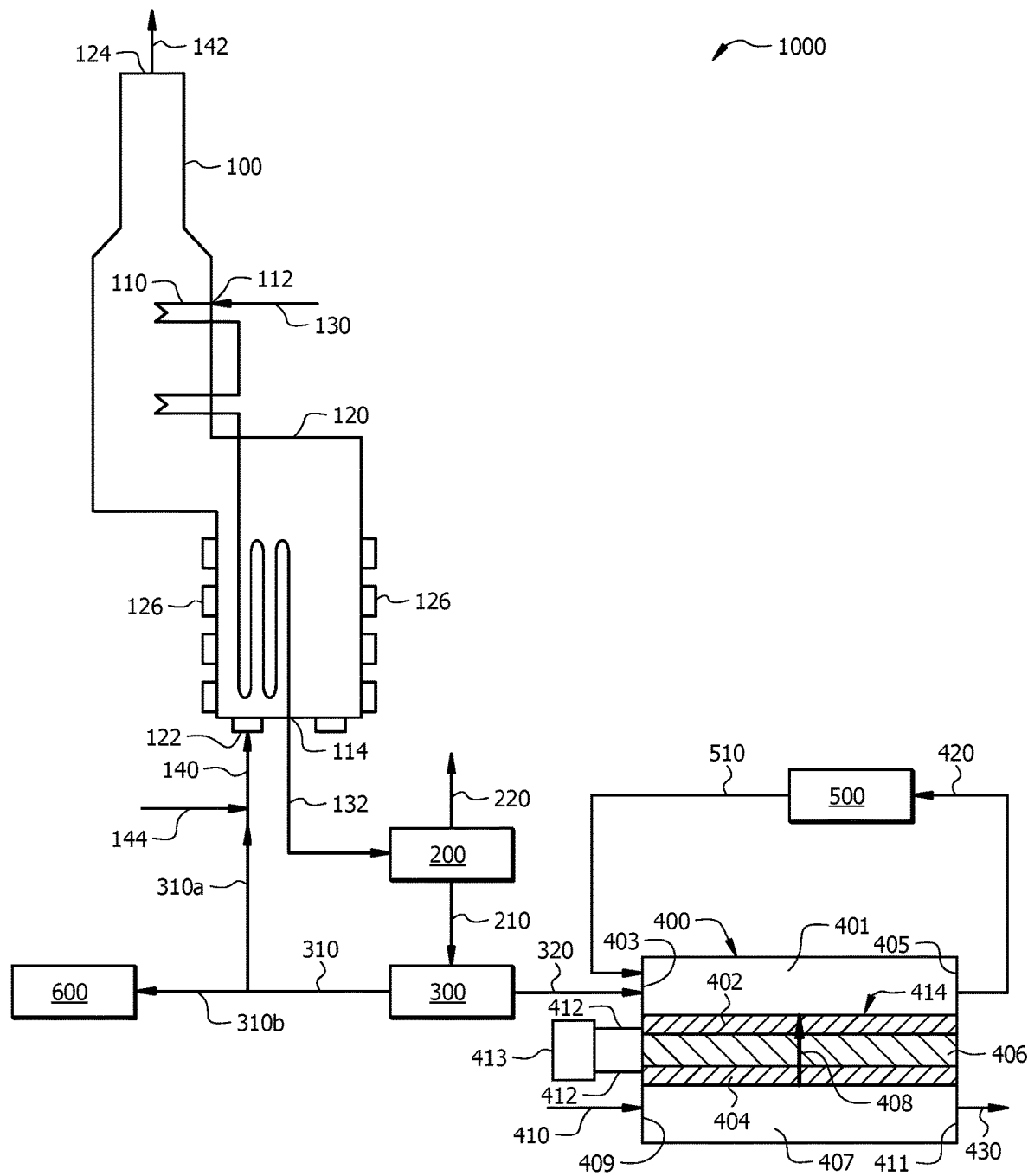
FIG. 1 illustrates a schematic diagram of an embodiment of a hydrocarbon cracking system.

Illustrative aspects of the subject matter claimed herein will now be disclosed. In the interest of clarity, not all features of an actual implementation are described in this specification. It can be appreciated that in the development of any such actual aspect, numerous implementation-specific decisions must be made to achieve the developers' specific goals, such as compliance with system-related and business-related constraints, which can vary from one implementation to another. Moreover, it can be appreciated that such a development effort, even if complex and time-consuming, would be a routine undertaking for those of ordinary skill in the art having the benefit of this disclosure.

As used herein, any recited ranges of values contemplate all values within the range including the end points of the range, and are to be construed as support for claims reciting any sub-ranges having endpoints within the recited range. By way of example, a disclosure in this specification of a range of from 10 to 15 shall be considered to support claims to values of 10, 11, 12, 13, 14, and 15, and to any of the following ranges: 10-11, 10-12, 10-13, 10-14, 10-15, 11-12, 11-13, 11-14, 11-15, 12-13; 12-14, 12-15, 13-14, 13-15, and 14-15.

The term "stream" as used herein refers to a composition of the components disclosed herein for the respective stream. The term "stream" can additionally refer to and imply associated equipment, such as conduit, line, and pipe that is used to move the composition from one location to another (e.g., a stream from one equipment unit to another equipment unit).

The term "conduit" as used herein refers to a tubular structure through which a fluid can flow and having a wall thickness rated for the fluid pressure. A conduit can be embodied as a pipe or tube, for example. Additionally, conduit may refer to a segment of pipe or tubes, or to a series or string of pipes or tubes.

The term "derivative product stream" as used herein refers to a stream that is derived from the hydrogen-rich methane stream disclosed herein, where "derived" means that any number and type of process steps can occur to obtain the derivative product stream from the hydrogen-rich methane stream. Examples of derivative product streams disclosed herein are the methane product stream, the recycle stream, and the reformer product stream.

A hydrocarbon cracking system produces a cracking product, and the cracking product can be separated to recover valuable hydrocarbons. In the separation, a tail gas containing hydrogen and methane can be formed, and the tail gas can be fed to the furnace of the hydrocarbon cracking system as fuel. Feeding the tail gas back to the furnace in the cracking system results in combustion of the methane, which converts the methane to carbon dioxide. The carbon dioxide exits from the furnace as part of the flue gas of the furnace. While the flue gas emitted from a furnace can be treated to capture carbon dioxide, it has been found that the presence of hydrogen in the tail gas, when used as at least a portion of the fuel for the furnace of the hydrocarbon cracking system, can reduce the concentration of the carbon dioxide in the flue gas that is treated to capture carbon dioxide. The presence of hydrogen, hydrogen combustion products, and reduced amount of methane in the flue gas presents a challenge for carbon capture techniques that are performed on the flue gas.

The disclosed processes and systems treat the tail gas of the hydrocarbon cracking system. The disclosed processes and systems utilize a fuel cell having an assembly that converts methane to carbon dioxide and hydrogen to water, while generating electricity that can be used to power equipment. In aspects, the carbon dioxide and water produced by the fuel cell can be subject to carbon capture to produce a CO2 product that can be stored, used in a process, transported by pipeline, or sequestered. In the context of a hydrocarbon cracking system, the disclosed processes and systems shift at least part of the carbon capture away from the flue gas and to the tail gas of the hydrocarbon cracking system. Moreover, the disclosed processes and systems provide aspects of sustainability because the electricity generated by the fuel cell can be used to power equipment. In some aspects, the electricity generated can provide incentive to convert fossil-fuel powered equipment to be powered by electric motors (e.g., pumps, compressors) or electric heaters (e.g., electric heaters for a reactor or furnace). Moreover still, the streams treated herein have low levels of nitrogen, or no nitrogen, which avoids formation of NOx compounds in the fuel cell and avoids the need for nitrogen removal equipment to avoid or address formation of NOx compounds in the fuel cell.

The following description refers to treatment of a hydrogen-rich methane stream, which in some aspects, can be embodied as the tail gas of a hydrocarbon cracking system. It should be understood that the disclosed processes and systems can be applied to any petrochemical stream containing methane and hydrogen.

FIG. 1 is a schematic diagram of an embodiment of a hydrocarbon cracking system 1000. The system 1000 includes a furnace 100, a first separator 200, a second separator 300, a fuel cell 400, and a carbon capture process 500. In some aspects, the system 1000 can additionally include a unit 600.

The furnace 100 can be fired with methane or hydrogen. The furnace 100 includes conduit 110 that passes hydrocarbon feed components through the interior of the furnace 100 at temperature sufficient to convert an alkane to an olefin (e.g., ethane to ethylene, propane to propylene, or both). The conduit 110 can be configured to pass through a furnace housing 120 of the furnace 100 where a fuel gas is combusted in the presence of oxygen to produce heat for cracking of the hydrocarbons in the conduit 110. The furnace 100 has a first inlet 112 for the conduit 110 that is connected to a hydrocarbon feed stream 130. The furnace 100 has a first outlet 114 for the conduit 110 that is connected to a first cracking product stream 132. The furnace 100 has a fuel inlet 122 fluidly coupled to a fuel gas stream 140. The furnace 100 has a flue gas outlet 124 fluidly coupled to a flue gas stream 142. The furnace housing 120 of the furnace 100 has burners 126 configured to provide flames for combustion of fuel gas that is received from the fuel gas stream 140. In aspects, the burners 126 are configured with metallurgy for hydrocarbon-based combustion in the furnace housing 120. The fuel gas stream 140 contains air supplied from air stream 144 and fuel (e.g., methane for a methane fuel fired furnace or hydrogen for a hydrogen fired furnace).

The hydrocarbon feed stream 130 can include any hydrocarbon or combination of hydrocarbons. For example, the hydrocarbon feed stream 130 can include ethane, propane, butane, or combinations thereof. The hydrocarbon(s) can be received from a hydrocarbon source, such as a pipeline or storage tank.

The first cracking product stream 132 can include methane, hydrogen, cracking products (e.g., ethylene, propylene, butadiene, benzene, or combinations thereof), and uncracked feed hydrocarbons (e.g., ethane, propane, butane, or combinations thereof). In aspects, the first cracking product stream 132 can include methane, hydrogen, uncracked feed hydrocarbon(s), and cracking products.

In aspects where the furnace 100 is a methane fuel fired furnace, the fuel gas stream 140 can include gaseous components resulting from the combination of air stream 144 and a source of methane, such as a natural gas pipeline or at least a portion of methane product stream 320 that is produced as described below. For example, the fuel gas stream 140 can include oxygen, nitrogen, and methane.

In aspects where the furnace 100 is a methane fuel fired furnace, the flue gas stream 142 can include carbon dioxide, nitrogen, water vapor, uncombusted oxygen, or combinations thereof. "Uncombusted oxygen" refers to oxygen that is fed in fuel gas stream 140 to the furnace 100 and passes unreacted to the flue gas in flue gas stream 142. In aspects, the flue gas stream 142 can include primarily carbon dioxide, nitrogen, and water vapor; alternatively, greater than 50, 60, 70, 80, or 90 vol % carbon dioxide, nitrogen, and water vapor, based on a total volume of the flue gas stream 142. The flue gas stream 142 can have carbon dioxide present in an amount ranging from about 5 vol % to about 30 vol % based on a total volume of the flue gas stream 142. In further aspects, the flue gas stream 142 can be fed to a carbon capture process (e.g., such as carbon capture process 500).

In aspects where the furnace 100 is a hydrogen fired furnace, the fuel gas stream 140 can include gaseous components resulting from the combination of air stream 144 and hydrogen from a hydrogen source (e.g., hydrogen product stream 310, hydrogen storage tank, hydrogen process stream from another process, pipeline). For example, the fuel gas stream 140 can include oxygen, nitrogen, and hydrogen. In aspects, the fuel gas stream 140 can additionally contain small amounts of methane as described for the hydrogen product stream 310 herein. The concentration of hydrogen in the fuel gas stream 140 is greater than the concentration of methane in the fuel gas stream 140. For example, a volume ratio of hydrogen:methane in the fuel gas stream 140 can range from about 7:1 to about 1,000:1.

In aspects where the furnace 100 is a hydrogen fired furnace, the flue gas stream 142 stream emitted from the furnace 100 can be referred to herein as a hydrogen combustion product stream. In these aspects, the flue gas stream 142 can include water vapor, nitrogen, and uncombusted oxygen. "Uncombusted oxygen" refers to oxygen that is fed in fuel gas stream 140 to the furnace 100 and passes unreacted to the flue gas stream 142. In aspects, the flue gas stream 142 is free of carbon dioxide. "Free of carbon dioxide" can include less than 1, 0.9, 0.8, 0.7, 0.6, 0.5, 0.4, 0.3, 0.2, or 0.1 vol % carbon dioxide based on a total volume of the flue gas stream 142. In some aspects, the flue gas stream 142 can be fed to a carbon capture process (e.g., such as carbon capture process 500).

The hydrocarbon cracking system 1000 can additionally include a separator 200. The separator 200 can be fluidly connected to and configured to receive the first cracking product stream 132. The separator 200 is configured to separate stream 132 into a hydrogen-rich methane stream 210 and a second cracking product stream 220 (which can be embodied as a plurality of cracking product streams). The separator 200 can be embodied as a distillation column in a demethanizer system, configured to remove methane and lighter molecules (e.g., hydrogen) from ethylene and heavier molecules. The hydrocarbon cracking system 1000 can include other equipment to facilitate recovery of one or more cracking product streams, such as a quench tower, a caustic tower, dryers, compression stage, a deethanizer system, a depropanizer system, a cold box, heat exchangers, or combinations thereof.

The hydrogen-rich methane stream 210 can include hydrogen, methane, and other hydrocarbons (e.g., uncracked feed components such as ethane, propane, butane, or combinations thereof; cracking products such as ethylene, propylene, butene, butadiene, benzene, or combinations thereof). In aspects, the hydrogen-rich methane stream 210 can include hydrogen in a range of from about 40 vol % to less than 100 vol %; alternatively, in a range of from about 40 vol % to about 90 vol %; alternatively, in a range of from about 90 vol % to less than 100 vol % based on a total volume of the hydrogen-rich methane stream 210. In additional aspects, the hydrogen-rich methane stream 210 can include methane in a range of from about 10 vol % to about 85 vol % based on a total volume of the hydrogen-rich methane stream 210. In aspects, the hydrogen-rich methane stream 210 is free of nitrogen, containing 0 vol % nitrogen or less than 1, 0.1, 0.01, 0.001 vol % nitrogen based on a total volume of the hydrogen-rich methane stream 210.

The second cracking product stream 220 can include cracking products (e.g., ethylene, propylene, butadiene, benzene, or combinations thereof), uncracked feed hydrocarbons (e.g., ethane, propane, butane, or combinations thereof), or combinations thereof, that are separated in the separator 200. In alternative aspects, the second cracking product stream 220 includes multiple cracking product streams, e.g., a stream comprising ethylene, a stream comprising propylene, a stream comprising butadiene, a stream comprising benzene, multiple other streams comprising uncracked feed hydrocarbons, or combinations thereof.

The hydrocarbon cracking system 1000 can additionally include a separator 300. The separator 300 is fluidly connected to and configured to receive the hydrogen-rich methane stream 210. The separator 300 is configured to separate the hydrogen-rich methane stream 210 into a methane product stream 320 containing methane and a hydrogen product stream 310 containing hydrogen. The separator 300 can be embodied as vessels and equipment configured to separate methane from hydrogen by pressure swing absorption, membrane separation, cryogenic separations (e.g., cryogenic distillation columns), or combinations thereof.

The hydrogen product stream 310 can include hydrogen in a range of from about 88 vol % to about 100 vol %; alternatively, from about 90 vol % to about 99.9 vol %; alternatively, from about 95 vol % to about 99.9 vol %, based on a total volume of the hydrogen product stream 310. In some aspects, the hydrogen product stream 310 is not pure hydrogen, e.g., does not contain 100 vol % hydrogen. In these aspects, the hydrogen product stream 310 can contain methane in a range of from about 0.1 vol % to about 12 vol %; alternatively, from about 0.1 vol % to about 10 vol %; alternatively, from about 0.1 to about 5 vol %, based on a total volume of the hydrogen product stream 310.

In aspects, the hydrogen product stream 310 can be fluidly connected to the fuel gas stream 140, to a unit 600, or to both. That is, the hydrogen product stream 310 can flow hydrogen from the separator 300 to the furnace 100, to the unit 600, or to both the furnace 100 (e.g., via first portion 310a of the hydrogen product stream 310) and the unit 600 (e.g., via second portion 310b of the hydrogen product stream 310). The unit 600 is described in more detail herein.

The methane product stream 320 can be fluidly connected to the fuel cell 400 such that the methane in methane product stream 320 feeds to the fuel cell 400. The methane product stream 320 can include methane in a range of from about 60 vol % to about 100 vol % based on a total volume of the methane product stream 320. In aspects, the methane product stream 320 can include hydrogen in a range of from 0 vol % to about 40 vol % based on a total volume of the methane product stream 320. In aspects, the methane product stream 320 is free of nitrogen, containing 0 vol % nitrogen or less than 1, 0.1, 0.01, 0.001 vol % nitrogen based on a total volume of the methane product stream 320.

The hydrocarbon cracking system 1000 can additionally include a fuel cell 400. The fuel cell 400 has an anode chamber 401 having an inlet 403 and an outlet 405, and a cathode chamber 407 having an inlet 409 and an outlet 411. The anode chamber 401 and the cathode chamber 407 are fluidly separated by an assembly 414. The assembly 414 includes an anode 402, a cathode 404, and an element 406 (also referred to as a separating element) assembled between the anode 402 and a cathode 404. The anode 402 has one side facing the element 406 and another side facing the anode chamber 401. The cathode 404 has one side facing the element 406 and another side facing the cathode chamber 407.

Wires 412 can connect the anode 402 and the cathode 404 of the assembly 414 to a load 413, which can be equipment in or near the hydrocarbon cracking system 1000. Such equipment can include, but is not limited to, one or more pumps, one or more compressors, one or more electric heaters for a hydrocarbon cracking system furnace, or combinations thereof.

The operating temperature of the fuel cell 400 can be any suitable temperature. For example, the operating temperature can be in a range of from about 100° C. to about 1200° C.; alternatively, in a range of from about 600° C. to about 1200° C. In aspects, the fuel cell 400 can be operated at an efficiency in a range of from 40% to 100%; alternatively, from 40% to 90%; alternatively, from 40% to 80%; alternatively, from 40% to 70%; alternatively, from 40% to 60%; alternatively, about 50%.

It should be noted that the fuel cell 400 is illustrated as a single cell for clarity. In aspects, it is contemplated that the fuel cell 400 can be part of a fuel cell stack having a plurality of fuel cells arranged in series, in parallel, or both in series and in parallel, where each fuel cell is configured as described for fuel cell 400. Moreover, it is contemplated that the fuel cell 400 can be part of a plurality of fuel cell stacks that are arranged in parallel, in series, or both in series and in parallel, forming a fuel cell array, where each fuel cell is configured as described for the fuel cell 400. In such aspects, the methane product stream 320 can include a splitter (e.g., a piping connector configured to split flow into multiple streams) to split the methane product stream 320 into a number of portions that corresponds to the number of anodes in the fuel cell stack. Similarly, the oxygen-containing stream 410 can include a splitter (e.g., a piping connector configured to split flow into multiple streams) to split the oxygen-containing stream 410 into a number of portions that corresponds to the number of cathodes in the fuel cell stack. Similarly, still, the anode of each fuel cell in the fuel cell stack can have an outlet fluidly connected to a combining connector (e.g., a piping connector configured to combine flow from sources) to combine the outlets of the anodes of the fuel cell stack into the first fuel cell product stream 420. Similarly, still, the cathode of each fuel cell in the fuel cell stack can have an outlet fluidly connected to a combining connector (e.g., a piping connector configured to combine flow from sources) to combine the outlets of the cathodes of the fuel cell stack into the second fuel cell product stream 430.

Solid Oxide Fuel Cell

In aspects, the fuel cell 400 can be embodied as a solid oxide fuel cell. For a solid oxide fuel cell, the anode 402 can be formed of a porous solid oxide material, optionally including a metal (e.g., Ni, Rd, Pt, or combinations thereof) for reformation of methane to hydrogen within the anode 402. Porous solid oxides for use as the anode 402 include alumina-based ceramics, titania-based ceramics, zirconia-based ceramics, and combinations thereof. A specific example of a solid oxide anode is yttria stabilized zirconia (YSZ), and a specific example of a metal-solid oxide anode is nickel yttria stabilized zirconia (Ni-YSZ). The cathode 404 can also be formed of a porous solid oxide material. Porous solid oxides for use as the cathode 404 can include alumina-based ceramics, titania-based ceramics, zirconia-based ceramics, magnesium-based ceramics, and combinations thereof. A specific example of a solid oxide anode material is lanthanum strontium manganite (LSM), yttria stabilized zirconia (YSZ), or a combination thereof. When the fuel cell 400 is a solid oxide fuel cell, the element 406 can be a solid oxide element formed of a dense solid oxide material, for example, embodied as an electrolyte layer or a membrane. In these aspects, the solid oxide element is selective or permeable to oxygen ions. In some aspects, the solid oxide element is not configured to transport other molecules and compounds across the solid oxide element. That is, in some aspects, methane, hydrogen, water, carbon dioxide, and carbon monoxide in the anode chamber 401 do not transport as molecules or ions across the solid oxide element to the cathode chamber 407, and nitrogen in the cathode chamber 407 does not transport as a molecule or ion across the solid oxide element to the anode chamber 401. In aspects where the solid oxide element is a ceramic membrane, the membrane is permeable to oxygen and not permeable to nitrogen (or any molecule or compound in the anode chamber 401). Examples of solid oxides used as a solid oxide element include, but are not limited to, yttria stabilized zirconia (YSZ), scandia stabilized zirconia (ScSZ), cerium gadolinium oxide (CDO), and combinations thereof.

The anode chamber 401 can receive the methane product stream 320, and the cathode chamber 407 can receive the oxygen-containing stream 410. The composition of the methane product stream 320 is described above, and the composition of the oxygen-containing stream 410 can be air (primarily oxygen and nitrogen as is known in the art), or air in combination with additional oxygen supplied from a process stream.

In the cathode 404, oxygen in the cathode chamber 407 that is received from the oxygen-containing stream 410 passes through the pores in the solid oxide material of the cathode 404 and reacts with the solid oxide element to form oxygen ions. Oxygen ions ($O^{2-}$) pass through the solid oxide element in the direction of arrow 408 to the anode 402.

In the anode 402, methane and any hydrogen that is received from the methane product stream 320 passes through the pores in the solid oxide material of the anode 402 and react with the oxygen ions from the solid oxide element to form carbon dioxide, carbon monoxide, and water. The reactions in the anode 402 include:

$$H_2+O^{2-}\rightarrow H_2O+2e^-$$

$$CH_4+3O^{2-}\rightarrow CO+2H_2O+6e^-$$

$$CH_4+4O^{2-}\rightarrow CO_2+2H_2O+3e^-$$

$$CH_4\rightarrow C+4H2$$

$$C+O^{2-}\rightarrow CO+2e^-$$

$$C+2O^{2-}\rightarrow CO_2+4e^-$$

As can be seen, these reactions convert methane and any hydrogen to water, carbon monoxide, and carbon dioxide. The methane reformation (e.g., reaction of methane to form hydrogen) is an endothermic reaction and can absorb some of the heat generated by the fuel cell 400. Moreover, these reactions create a potential difference between the anode 402 and the cathode 404, create an electrical charge across the solid oxide element, and generate electricity that can be conducted through electrically conducting wires 412 to the load 413.

The water, carbon dioxide, carbon monoxide, unreacted methane, unreacted hydrogen, or combinations thereof flow from the outlet 405 of the anode chamber 401 in a first fuel cell product stream 420 (which can also be referred to as an anode off-gas stream) to the carbon capture process 500. In aspects, the first fuel cell product stream 420 can include carbon dioxide in a range of from about 60 vol % to less than 100 vol %; alternatively, in a range of from about 60 vol % to about 90 vol %; alternatively, in a range of from about 90 vol % to less than 100 vol % based on a total volume of the first fuel cell product stream 420. In aspects, the first fuel cell product stream 420 can include carbon monoxide in a range of from about 1 vol % to about 10 vol %; alternatively, in a range of from about 1 vol % to about 5 vol % based on a total volume of the first fuel cell product stream 420. In aspects, the first fuel cell product stream 420 can include unreacted methane in a range of from about 1 vol % to about 30 vol %; alternatively, in a range of from about 1 vol % to about 20 vol %; alternatively, in a range of from about 5 vol % to about 20 vol % based on a total volume of the first fuel cell product stream 420. In aspects, the first fuel cell product stream 420 can include unreacted hydrogen in a range of from about 1 vol % to about 20 vol %; alternatively, in a range of from about 1 vol % to about 15 vol %; alternatively, in a range of from about 1 vol % to about 10 vol % based on a total volume of the first fuel cell product stream 420. In additional aspects, the first fuel cell product stream 420 can include water in a range of from about 1 vol % to about 10 vol % based on a total volume of the first fuel cell product stream 420.

Unreacted oxygen and nitrogen flow from the outlet 411 of the cathode chamber 407 in the second fuel cell product stream 430 (which can also be referred to as a cathode off-gas stream). The contents of stream 430, containing primarily oxygen and nitrogen can be recycled for use in oxygen-containing stream 410 or used in another process, for example. "Unreacted oxygen" in the second fuel cell product stream 430 refers to oxygen that is fed in fuel cell 400 and passes unreacted to the second fuel cell product stream 430.

In aspects, the fuel cell 400 embodied as a solid oxide fuel cell can have a single pass conversion of greater than 50, 60, 70, 80, or 90% based on a volume of methane and hydrogen that is converted to water, carbon dioxide, and carbon monoxide.

Molten Carbonate Fuel Cell

In aspects, the fuel cell 400 can be embodied as a molten carbonate fuel cell. For the molten carbonate fuel cell, the anode 402 can be formed of a porous nickel-based alloy, e.g., an alloy of nickel with chromium, aluminum, or both chromium and aluminum. The cathode 404 can be formed of a porous lithium-based oxide, such as a lithium titanium oxide material or a lithium nickel oxide material. When the fuel cell 400 is a molten carbon fuel cell, the element 406 can be a molten carbonate element, formed of sodium carbonate, potassium carbonate, or a combination thereof, that is/are contained in a ceramic support and embodied as an electrolyte layer. The molten carbonate element is selective or permeable to carbonate ions ($CO_3^{2-}$). In some aspects, the molten carbonate element is not configured to transport other molecules and compounds across the molten carbonate element. That is, in some aspects methane, hydrogen, water, carbon dioxide, and carbon monoxide in the anode chamber 401 do not transport as molecules or ions across the molten carbonate element to the cathode chamber 407, and nitrogen in the cathode chamber 407 does not transport as a molecule or ion across the molten carbonate element to the anode chamber 401.

The anode chamber 401 can receive the methane product stream 320, and the cathode chamber 407 can receive the oxygen-containing stream 410. The composition of the methane product stream 320 is described above, and the composition of the oxygen-containing stream 410 can be air (primarily oxygen, nitrogen, and carbon dioxide as is known in the art), or air in combination with additional carbon dioxide supplied from a process stream.

In the cathode 404, carbon dioxide and oxygen in the cathode chamber 407 that are received from the oxygen-containing stream 410 pass through the pores in the material of the cathode 404 and react with the molten carbonate element to form carbonate ions. Carbonate ions ($CO_3^{2-}$) pass through the molten carbonate element in the direction of arrow 408 to the anode 402.

In the anode 402, hydrogen that is received from the methane product stream 320 passes through the pores in the material of the anode 402 and reacts with the carbonate ions from the molten carbonate element to form carbon dioxide and water. The water reacts with the methane that is received from the methane product stream 320 to form carbon monoxide, and the carbon monoxide reacts with the carbonate ions from the molten carbonate element to form carbon dioxide. The reactions in the anode 402 include:

$$3H_2 + 3CO_3^{2-} \rightarrow 3H_2O + 3CO_2 + 6e^-$$

$$CH_4 + H_2O \rightarrow CO + 3H_2$$

$$CO + CO_3^{2-} \rightarrow 2CO_2 + 2e^-$$

These reactions create a potential difference between the anode 402 and the cathode 404, create an electrical charge across the molten carbonate element, and generate electricity that can be conducted through electrically conducting wires 412 to the load 413.

The carbon dioxide (along with any unreacted water, unreacted carbon monoxide, unreacted methane, unreacted hydrogen, or combinations thereof) flows from the outlet 405 of the anode chamber 401 in a first fuel cell product stream 420 (which can also be referred to as an anode off-gas stream) to the carbon capture process 500. In aspects, the first fuel cell product stream 420 can include carbon dioxide in a range of from about 60 vol % to less than 100 vol %; alternatively, in a range of from about 60 vol % to about 90 vol %; alternatively, in a range of from about 90 vol % to less than 100 vol % based on a total volume of the first fuel cell product stream 420. In aspects, the first fuel cell product stream 420 can include carbon monoxide in a range of from about 1 vol % to about 10 vol %; alternatively, in a range of from about 1 vol % to about 5 vol % based on a total volume of the first fuel cell product stream 420. In aspects, the first fuel cell product stream 420 can include unreacted methane in a range of from about 1 vol % to about 30 vol %; alternatively, in a range of from about 1 vol % to about 20 vol %; alternatively, in a range of from about 5 vol % to about 20 vol % based on a total volume of the first fuel cell product stream 420. In aspects, the first fuel cell product stream 420 can include unreacted hydrogen in a range of from about 1 vol % to about 20 vol %; alternatively, in a range of from about 1 vol % to about 15 vol %; alternatively, in a range of from about 1 vol % to about 10 vol % based on a total volume of the first fuel cell product stream 420. In additional aspects, the first fuel cell product stream 420 can include water in a range of from about 1 vol % to about 10 vol % based on a total volume of the first fuel cell product stream 420.

Unreacted gas (unreacted oxygen, unreacted carbon dioxide) flows from the outlet 411 of the cathode chamber 407 in the second fuel cell product stream 430 (which can also be referred to as a cathode off-gas stream). The contents of stream 430, containing primarily oxygen and nitrogen can be recycled for use in oxygen-containing stream 410 or used in another process, for example. "Unreacted oxygen" in the second fuel cell product stream 430 refers to oxygen that is fed in fuel cell 400 and passes unreacted to the second fuel cell product stream 430. "Unreacted carbon dioxide" in the second fuel cell product stream 430 refers to carbon dioxide that is fed in fuel cell 400 and passes unreacted to the second fuel cell product stream 430.

In aspects, the fuel cell 400 embodied as a molten carbonate fuel cell can have a single pass conversion of greater than 50, 60, 70, 80, or 90% based on a volume of methane and hydrogen that is converted to carbon dioxide, water, and carbon monoxide.

The hydrocarbon cracking system 1000 can additionally include a carbon capture process 500, and the first fuel cell product stream 420 of the fuel cell 400 can be fluidly connected to the carbon capture process 500. The carbon capture process 500 can be configured to isolate carbon dioxide for storage, transport in a pipeline, or sequestration. The carbon capture process 500 can also be configured to produce a recycle stream 510 containing hydrogen, methane, carbon dioxide, or combinations thereof. In aspects, the carbon capture process 500 is not configured to couple with or to receive the flue gas stream 142.

Figure 5A:
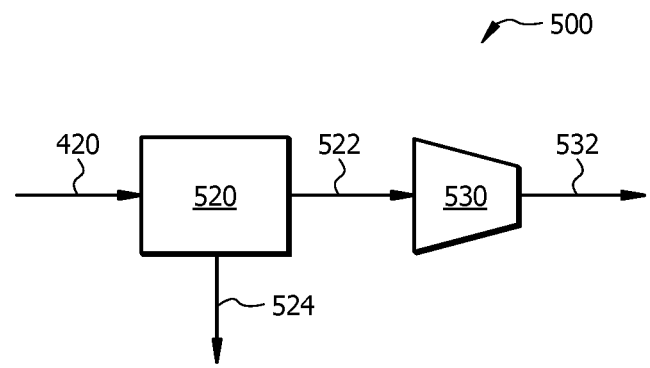
FIG. 5A illustrates a schematic diagram of an embodiment of the carbon capture process.
Figure 5B:
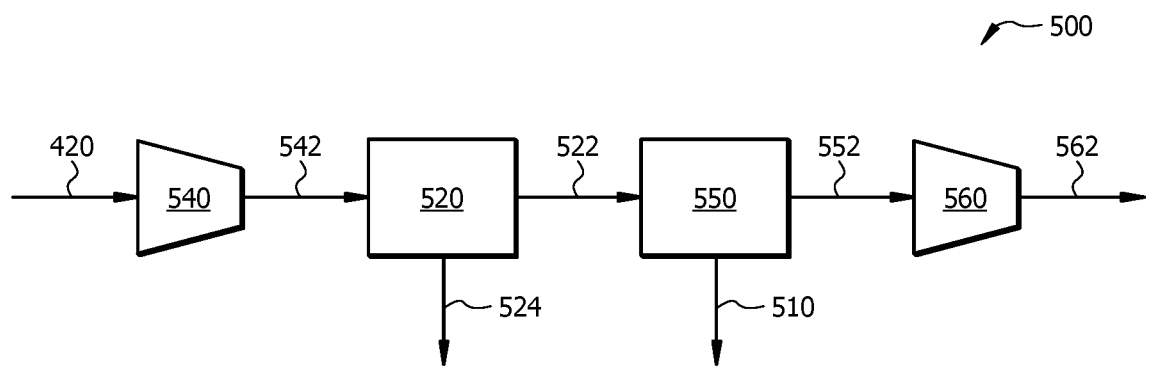
FIG. 5B illustrates a schematic diagram of another embodiment of the carbon capture process.

The carbon capture process 500 can include equipment for the removal of carbon dioxide from the first fuel cell product stream 420. For example, the carbon capture process 500 can include equipment for compression, gravity separation, flash separation, absorption, adsorption, membrane separation, carbon dioxide condensation, or a combination thereof, of carbon dioxide from the first fuel cell product stream 420. In aspects, carbon dioxide can be captured by passing the first fuel cell product stream 420 to an absorber having an amine-based (e.g., monoethanolamine) acid gas sorbent therein (e.g., connected an absorbent regeneration loop). The sorbent absorbs the carbon dioxide while other components of the first fuel cell product stream 420 (e.g., water vapor, unreacted methane, unreacted hydrogen, unabsorbed carbon dioxide, or combinations thereof) bubble through the sorbent to a gas outlet of the absorber. Carbon dioxide can be recovered from the sorbent in a sorbent regenerator, and regenerated sorbent can be recirculated back to the absorber. The recovered carbon dioxide can flow from the sorbent regenerator in a CO2 product stream for storage, transport, or sequestration. Embodiments of a carbon capture process 500 are illustrated in FIGS. 5A and 5B and described herein.

The unit 600 can be configured to fluidly couple with and to receive the hydrogen product stream 310, or a portion 310b of the hydrogen product stream 310. The unit 600 can include i) a hydrogen fired furnace, ii) a hydrogen fired boiler, iii) a hydrogen sales gas pipeline, iv) a storage container, v) another process, or vi) combinations thereof.

A process performed with system 1000 can include separating the first cracking product stream 132 into a hydrogen-rich methane stream 210 and one or more second cracking product streams 220; separating the hydrogen-rich methane stream 210 into a hydrogen product stream 310 and a methane product stream 320; introducing the methane product stream 320 to the anode chamber 401 of a fuel cell 400; introducing the oxygen-containing stream 410 to the cathode chamber 407 of the fuel cell 400, wherein the fuel cell 400 has an assembly 414 comprising the anode 402 and the cathode 404 that are separated by the element 406 (e.g., a solid oxide element or a molten carbonate element); and converting, at the anode 402 of the fuel cell 400, methane (and optionally any hydrogen) received from the methane product stream 320 to carbon dioxide and water to generate electricity. The process can also include i) heating the furnace 100 of the hydrocarbon cracking system 1000 or a furnace of another hydrocarbon cracking system with the electricity, ii) powering an electric motor of a pump or a compressor with the electricity, or iii) both i) and ii). The process can also include introducing the hydrogen product stream 310 to i) the furnace 100 of the hydrocarbon cracking system 1000, ii) a furnace of another hydrocarbon cracking system, iii) a hydrogen fired boiler, iv) a hydrogen sales gas pipeline, v) a storage container, or vi) another process. In aspects where the hydrogen product stream 310 is introduced to the furnace 100 of the hydrocarbon cracking system 1000, the process can also include cracking a hydrocarbon in the hydrocarbon cracking system 1000 to produce the first cracking product stream 132 by combusting the hydrogen product stream 310 in the furnace 100 of the hydrocarbon cracking system 1000. The process can also include recovering the first fuel cell product stream 420 from the anode chamber 401 of the fuel cell 400, wherein the first fuel cell product stream 420 comprises the carbon dioxide, the water, carbon monoxide, unreacted methane, unreacted hydrogen, or combinations thereof. The process can also include recovering the second fuel cell product stream 430 from the cathode chamber 407 of the fuel cell 400, wherein the second fuel cell product stream 430 comprises unreacted oxygen and nitrogen. The process can also include introducing the first fuel cell product stream 420 to a carbon capture process 500, and optionally, introducing the recycle stream 510 to the anode chamber 401 of the fuel cell 400. The process can include performing the carbon capture process 500 according to any embodiment disclosed herein.

Figure 2:
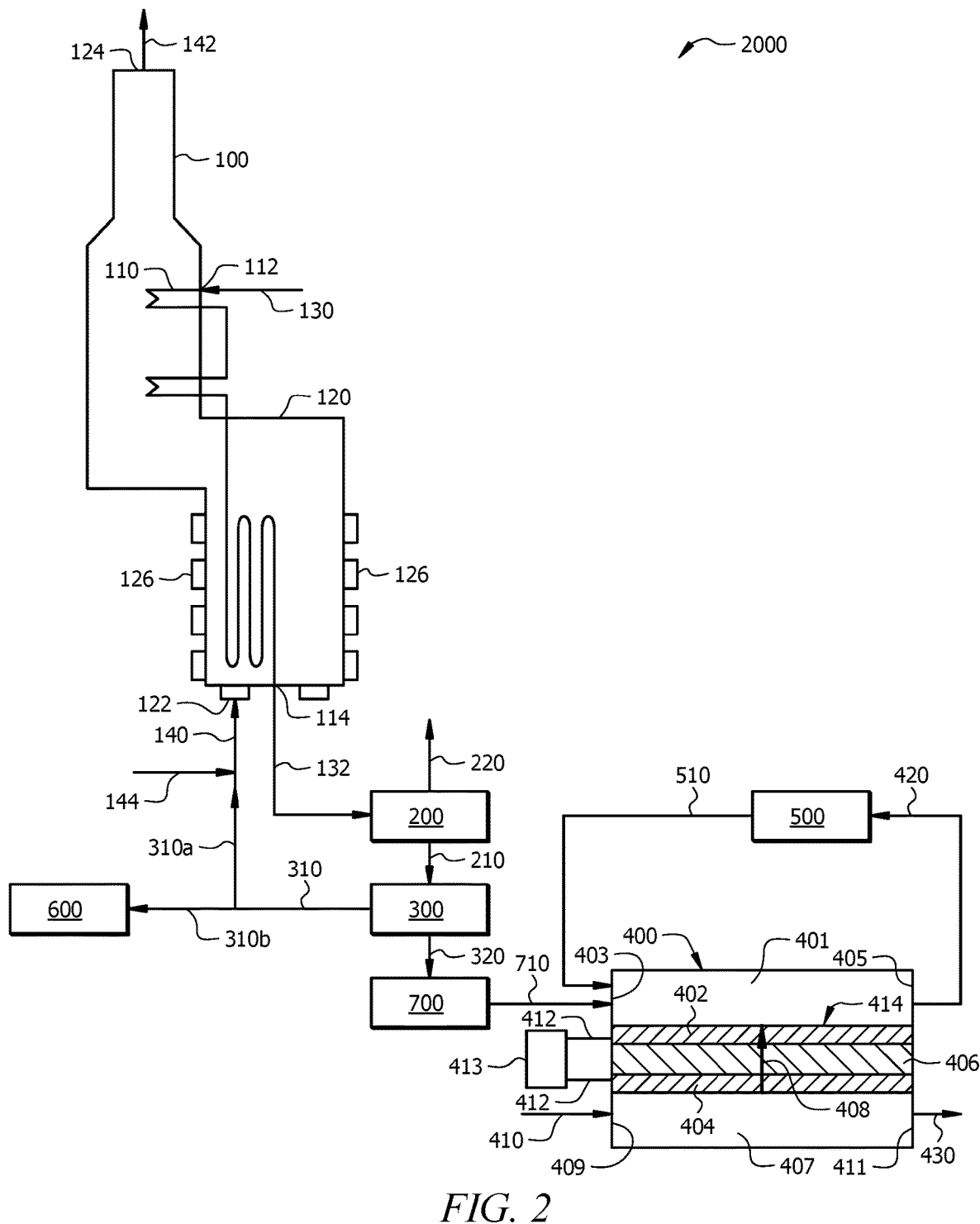
FIG. 2 illustrates a schematic diagram of another embodiment of the hydrocarbon cracking system.

FIG. 2 is a schematic diagram of an embodiment of a hydrocarbon cracking system 2000. The system 2000 includes a furnace 100, a first separator 200, a second separator 300, a steam methane reformer 700, a fuel cell 400, and a carbon capture process 500. In some aspects, the system 2000 can additionally include a unit 600. The furnace 100, the first separator 200, the second separator 300, the carbon capture process 500, and the unit 600 are the same as described for the system 1000 in FIG. 1. The system 2000 additionally includes a steam methane reformer 700.

The methane product stream 320 that flows from the separator 300 is fluidly connected to the steam methane reformer 700. The steam methane reformer 700 can be embodied as any vessel or combination equipment that is configured to perform catalyzed reactions that convert methane received from methane product stream 320 into carbon monoxide, carbon dioxide, and hydrogen. Steam methane reforming techniques are known in the art and generally involve the reaction of methane with steam at high temperatures (from about 700° C. to about 1100° C.), typically in the presence of a metal-based catalyst (e.g., a nickel-based catalyst), to produce carbon monoxide, carbon dioxide, and hydrogen. In some aspects, steam can be fed to the steam methane reformer 700 via a steam stream.

Reformer product stream 710 containing carbon monoxide, carbon dioxide, and hydrogen can flow from the steam methane reformer 700 and fluidly connect to the inlet 403 of the fuel cell 400. In aspects, the reformer product stream 710 can include hydrogen in a range of from about 50 vol % to less than 100 vol %; alternatively, in a range of from about 50 vol % to about 90 vol %; alternatively, in a range of from about 90 vol % to less than 100 vol % based on a total volume of the reformer product stream 710. In aspects, the reformer product stream 710 can include carbon dioxide and carbon monoxide in a range of from about 1 vol % to about 40 vol %; alternatively, in a range of from about 10 vol % to about 40 vol %; alternatively, in a range of from about 10 vol % to about 20 vol % based on a total volume of the reformer product stream 710. In additional aspects, the reformer product stream 710 can include methane in a range of less than 5, 4, 3, 2, or 1 vol % based on a total volume of the reformer product stream 710. In aspects, the reformer product stream 710 is free of nitrogen, containing 0 vol % nitrogen or less than 1, 0.1, 0.01, 0.001 vol % nitrogen based on a total volume of the reformer product stream 710. In some aspects, the steam methane reformer 700 can be configured to convert C2+ molecules without substantial conversion of methane, and can be referred to as a steam C2+ reformer. In such aspects, the reformer product stream 710 can include: i) methane in a range of 25 to 35 vol % based on a total volume of the reformer product stream 710, ii) carbon dioxide and carbon monoxide in a range of from about 1 vol % to about 25 vol % based on a total volume of the reformer product stream 710, iii) hydrogen in a range of from about 50 vol % to less than 100 vol % based on a total volume (which can be on a water-free basis as described above) of the reformer product stream 710, and iv) free of nitrogen. Any of the concentrations for the reformer product stream 710 can be additionally on a water-free basis, meaning that any concentration of water in the reformer product stream 710 is not included in the total volume of the reformer product stream 710.

The fuel cell 400 for the system 2000 in FIG. 2 is configured structurally similar to the fuel cell 400 described for the system 1000 in FIG. 1. The anode chamber 401 can receive the reformer product stream 710, and the cathode chamber 407 can receive the oxygen-containing stream 410. In the anode 402, hydrogen that is received from the reformer product stream 710 passes through the pores in the solid oxide material of the anode 402 and reacts with oxygen ions (for solid oxide fuel cell) or carbonate ions (for molten carbonate fuel cell) from the element 406 to form water. The reactions in the anode 402 of a solid oxide fuel cell include:

$$H_2 + O^{2-} \rightarrow H_2O + 2e^-$$

As can be seen, these reactions convert hydrogen to water. The reactions in the anode 402 of a molten carbonate fuel cell include:

$$3H_2 + 3CO_3^{2-} \rightarrow 3H_2O + 3CO_2 + 6e^-$$

$$CO + CO_3^{2-} \rightarrow 2CO_2 + 2e^-$$

As can be seen, these reactions convert hydrogen and carbon monoxide to water and carbon dioxide. The reactions create a potential difference between the anode 402 and the cathode 404, create an electrical charge across the element 406, and generate electricity that can be conducted through electrically conducting wires 412 to the load 413.

The first fuel cell product stream 420 can contain water, carbon monoxide, carbon dioxide, unreacted methane, unreacted hydrogen, or combinations thereof. In aspects, the first fuel cell product stream 420 can include carbon dioxide in a range of from about 20 vol % to less than 100 vol %; alternatively, in a range of from about 20 vol % to about 90 vol %; alternatively, in a range of from about 90 vol % to less than 100 vol % based on a total volume of the first fuel cell product stream 420. In aspects, the first fuel cell product stream 420 can include carbon monoxide in a range of from about 1 vol % to about 10 vol %; alternatively, in a range of from about 1 vol % to about 5 vol % based on a total volume of the first fuel cell product stream 420. In aspects, the first fuel cell product stream 420 can include unreacted methane in a range of from about 1 vol % to about 30 vol %; alternatively, in a range of from about 1 vol % to about 20 vol %; alternatively, in a range of from about 5 vol % to about 20 vol % based on a total volume of the first fuel cell product stream 420. In aspects, the first fuel cell product stream 420 can include unreacted hydrogen in a range of from about 1 vol % to about 20 vol %; alternatively, in a range of from about 1 vol % to about 15 vol %; alternatively, in a range of from about 1 vol % to about 10 vol % based on a total volume of the first fuel cell product stream 420. In additional aspects, the first fuel cell product stream 420 can include water in a range of from about 40 vol % to about 80 vol % based on a total volume of the first fuel cell product stream 420.

The first fuel cell product stream 420 is fluidly connected to the carbon capture process 500 and undergoes processing therein similar to the methods and techniques described herein for carbon capture of a stream containing water, carbon dioxide, carbon monoxide.

A process performed with system 2000 can include separating the first cracking product stream 132 into a hydrogen-rich methane stream 210 and one or more second cracking product streams 220; separating the hydrogen-rich methane stream 210 into a hydrogen product stream 310 and a methane product stream 320; introducing the methane product stream 320 to a steam methane reformer 700; converting, in the steam methane reformer 700, methane to hydrogen to produce a reformer product stream 710 comprising methane and hydrogen; introducing the reformer product stream 710 to the anode chamber 401 of a fuel cell 400; introducing an oxygen-containing stream 410 to the cathode chamber 407 of the fuel cell 400, wherein the fuel cell 400 has an assembly 414 comprising an anode 402 and cathode 404 that are separated by an element 406 (e.g., a solid oxide element or a molten carbonate element); and converting, at the anode 402 of the fuel cell 400, hydrogen (and optionally any unreacted methane) received from the reformer product stream 710 to water (and optionally carbon dioxide for unreacted methane) to generate electricity. The process can also include i) heating the furnace 100 of the hydrocarbon cracking system 2000 or a furnace of another hydrocarbon cracking system with the electricity, ii) powering an electric motor of a pump or a compressor with the electricity, or iii) both i) and ii). The process can also include introducing the hydrogen product stream 310 to i) the furnace 100 of the hydrocarbon cracking system 2000, ii) a furnace of another hydrocarbon cracking system, iii) a hydrogen fired boiler, iv) a hydrogen sales gas pipeline, v) a storage container, or vi) another process. In aspects where the hydrogen product stream 310 is introduced to the furnace 100 of the hydrocarbon cracking system 2000, the process can also include cracking a hydrocarbon in the hydrocarbon cracking system 2000 to produce the first cracking product stream 132 by combusting the hydrogen product stream 310 in the furnace 100 of the hydrocarbon cracking system 2000. The process can also include recovering the first fuel cell product stream 420 from the anode chamber 401 of the fuel cell 400, wherein the first fuel cell product stream 420 comprises carbon dioxide, carbon monoxide, water, unreacted methane, unreacted hydrogen, or combinations thereof. The process can also include recovering the second fuel cell product stream 430 from the cathode chamber 407 of the fuel cell 400, wherein the second fuel cell product stream 430 comprises unreacted oxygen and nitrogen. The process can also include introducing the first fuel cell product stream 420 to a carbon capture process 500, and optionally, introducing the recycle stream 510 to the anode chamber 401 of the fuel cell 400. The process can include performing the carbon capture process 500 according to any embodiment disclosed herein.

Figure 3:
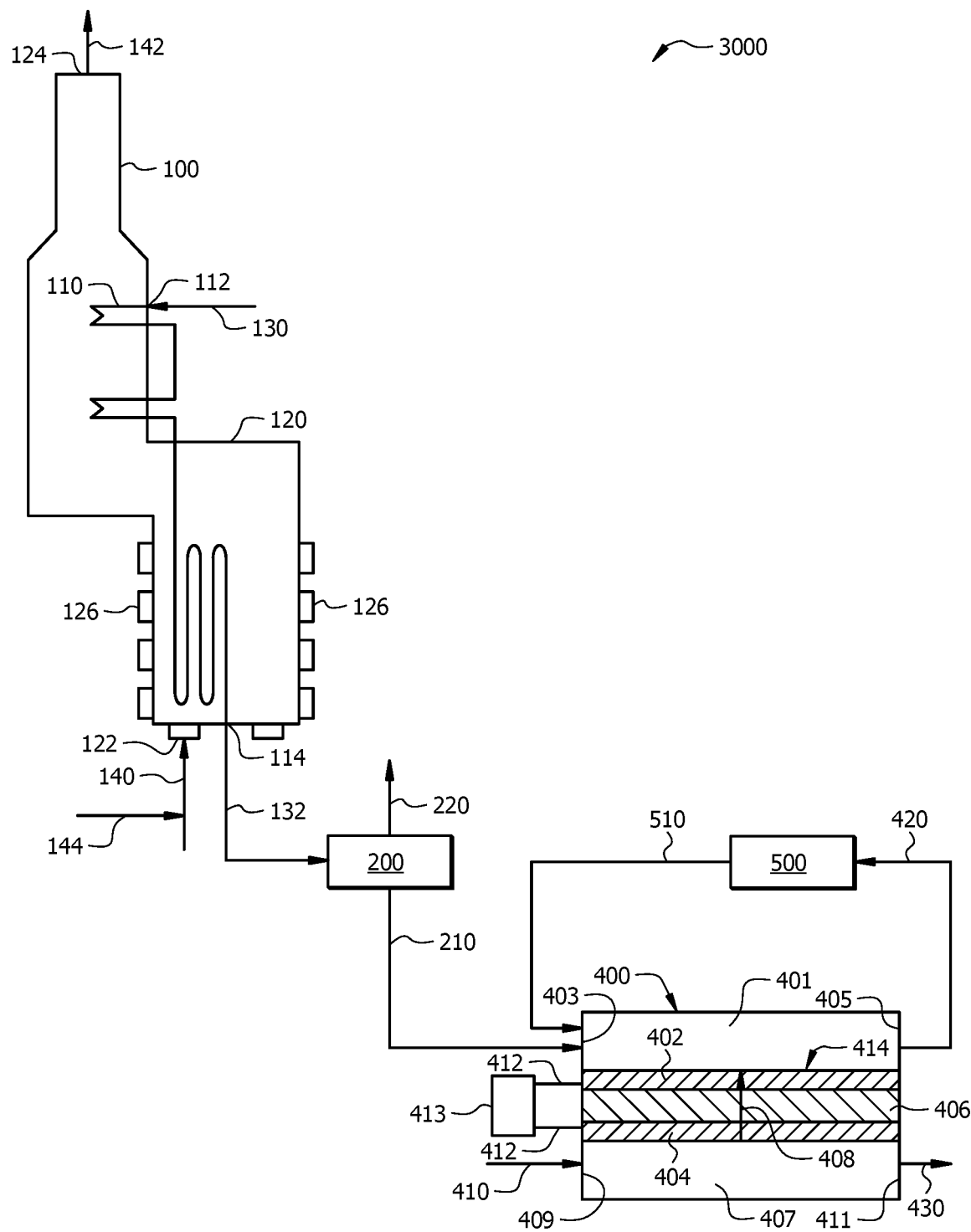
FIG. 3 illustrates a schematic diagram of another embodiment of the hydrocarbon cracking system.

FIG. 3 is a schematic diagram of an embodiment of a hydrocarbon cracking system 3000. The system 3000 includes a furnace 100, a first separator 200, a fuel cell 400, and a carbon capture process 500. Different than system 1000, the system 3000 does not include a second separator 300; thus, the hydrogen-rich methane stream 210 feeds directly to the fuel cell 400.

The furnace in system 3000 is the same as described for the system 1000 in FIG. 1, except that, in aspects where the furnace 100 is a hydrogen fired furnace, the hydrogen source for hydrogen that is in the fuel gas stream 140 does not include the hydrogen product stream 310, since system 3000 does not include separator 300. In system 3000, the fuel gas stream 140 can include gaseous components resulting from the combination of air stream 144 and hydrogen from a hydrogen source (e.g., hydrogen storage tank, hydrogen process stream from another process, a pipeline).

The separator 200 in system 3000 is the same as described for the separator 200 in system 1000. In the system 3000, the hydrogen-rich methane stream 210 that flows from the separator 200 is configured to fluidly connect with the inlet anode chamber of the fuel cell 400. The fuel cell 400 is configured structurally similar to the fuel cell 400 described for the system 1000 in FIG. 1. The reactions in the fuel cell 400 are the same as described above. The reactions create a potential difference between the anode 402 and the cathode 404, create an electrical charge across the element 406, and generate electricity that can be conducted through electrically conducting wires 412 to the load 413.

The water, carbon dioxide, carbon monoxide, unreacted methane, unreacted hydrogen, or combinations thereof flow from the outlet 405 of the anode chamber 401 in a first fuel cell product stream 420 (which can also be referred to as an anode off-gas stream). In aspects, the first fuel cell product stream 420 can include carbon dioxide in a range of from about 20 vol % to less than 100 vol %; alternatively, in a range of from about vol % to about 90 vol %; alternatively, in a range of from about 90 vol % to less than 100 vol % based on a total volume of the first fuel cell product stream 420. In aspects, the first fuel cell product stream 420 can include carbon monoxide in a range of from about 1 vol % to about 10 vol %; alternatively, in a range of from about 1 vol % to about 5 vol % based on a total volume of the first fuel cell product stream 420. In aspects, the first fuel cell product stream 420 can include unreacted methane in a range of from about 1 vol % to about 30 vol %; alternatively, in a range of from about 1 vol % to about 20 vol %; alternatively, in a range of from about 5 vol % to about 20 vol % based on a total volume of the first fuel cell product stream 420. In aspects, the first fuel cell product stream 420 can include unreacted hydrogen in a range of from about 1 vol % to about 20 vol %; alternatively, in a range of from about 1 vol % to about 15 vol %; alternatively, in a range of from about 1 vol % to about 10 vol % based on a total volume of the first fuel cell product stream 420. Any of the concentrations for the first fuel cell product stream 420 can be additionally on a water-free basis, meaning that any concentration of water in the first fuel cell product stream 420 is not included in the total volume of the first fuel cell product stream 420. In additional aspects, the first fuel cell product stream 420 can include water in a range of from about 50 vol % to about 100 vol % based on a total volume of the first fuel cell product stream 420.

Unreacted gases flow from the outlet 411 of the cathode chamber 407 in the second fuel cell product stream 430 (which can also be referred to as a cathode off-gas stream). The contents of stream 430 can be recycled for use in oxygen-containing stream 410 or used in another process.

The first fuel cell product stream 420 is fluidly connected to the carbon capture process 500. Except as noted above, the operation and embodiments of the fuel cell 400 and carbon capture process 500 in the system 3000 in FIG. 3 are the same as described for the system 1000 in FIG. 1.

A process performed with system 3000 can include separating the first cracking product stream 132 into a hydrogen-rich methane stream 210 and one or more second cracking product streams 220; introducing the hydrogen-rich methane stream 210 to the anode chamber 401 of a fuel cell 400; introducing the oxygen-containing stream 410 to the cathode chamber 407 of the fuel cell 400, wherein the fuel cell 400 has an assembly 414 comprising the anode 402 and the cathode 404 that are separated by the element 406 (e.g., a solid oxide element or a molten carbonate element); and converting, at the anode 402 of the fuel cell 400, methane and hydrogen received from the hydrogen-rich methane stream 210 to carbon dioxide and water to generate electricity. The process can also include i) heating the furnace 100 of the hydrocarbon cracking system 3000 or a furnace of another hydrocarbon cracking system with the electricity, ii) powering an electric motor of a pump or a compressor with the electricity, or iii) both i) and ii). The process can also include recovering the first fuel cell product stream 420 from the anode chamber 401 of the fuel cell 400, wherein the first fuel cell product stream 420 comprises carbon dioxide, carbon monoxide, water, unreacted methane, unreacted hydrogen, or combinations thereof. The process can also include recovering the second fuel cell product stream 430 from the cathode chamber 407 of the fuel cell 400, wherein the second fuel cell product stream 430 comprises unreacted oxygen and nitrogen. The process can also include introducing the first fuel cell product stream 420 to a carbon capture process 500, and optionally, introducing the recycle stream 510 (recovered from the carbon capture process 500) to the anode chamber 401 of the fuel cell 400. The process can include performing the carbon capture process 500 according to any embodiment disclosed herein. The process can also include cracking a hydrocarbon in the hydrocarbon cracking system 3000 to produce the first cracking product stream 132.

Figure 4:
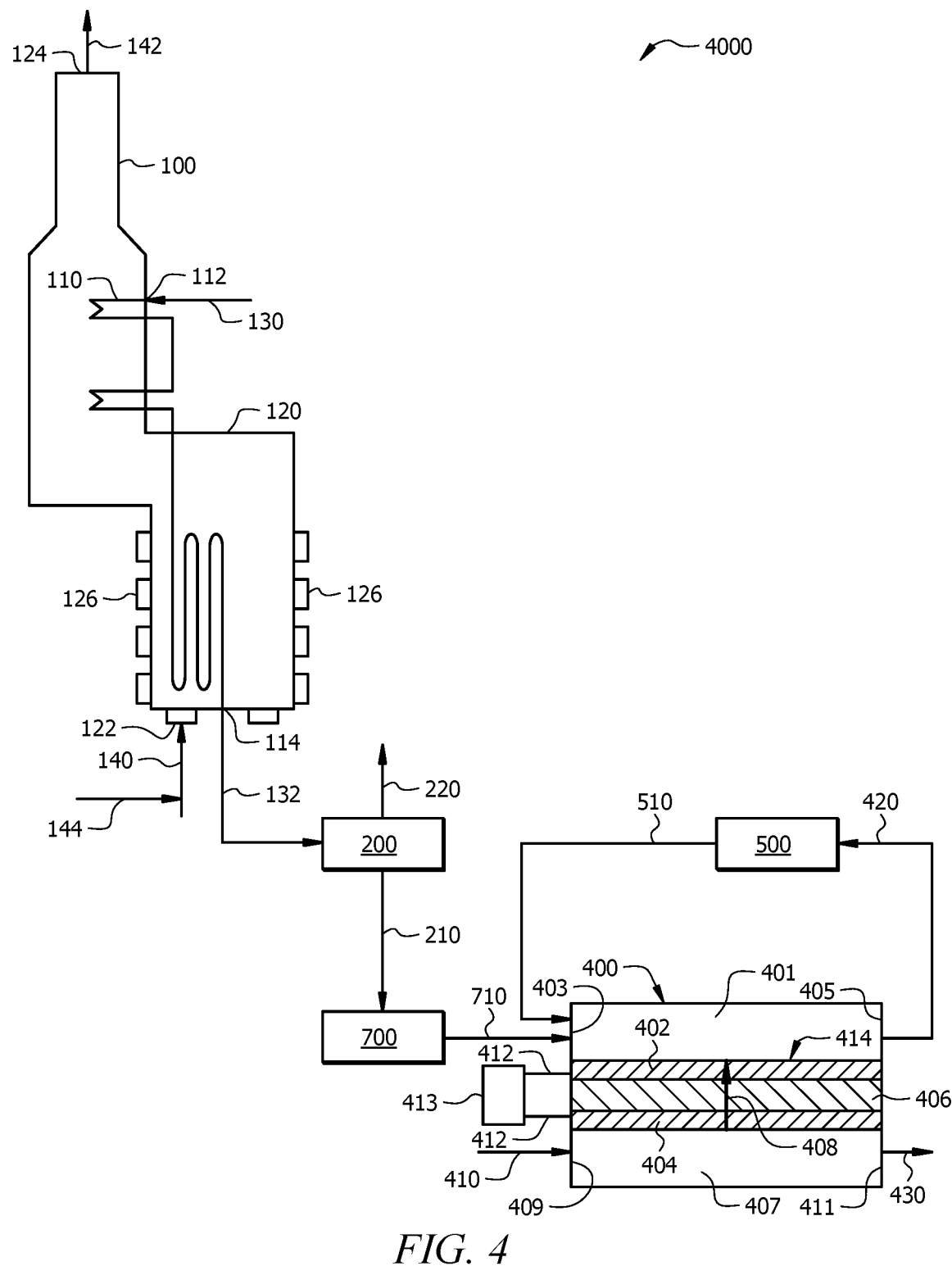
FIG. 4 illustrates a schematic diagram of another embodiment of the hydrocarbon cracking system.

FIG. 4 is a schematic diagram of an embodiment of a hydrocarbon cracking system 4000. The system 4000 includes a furnace 100, a first separator 200, a steam methane reformer 700, a fuel cell 400, and a carbon capture process 500. The system 4000 is similar to the system 3000; however, different than system 3000, the system 3000 additionally includes a steam methane reformer 700.

The furnace 100, the first separator 200, the fuel cell 400, and the carbon capture process 500, are the same as described for the system 3000 in FIG. 3.

The hydrogen-rich methane stream 210 that flows from the separator 200 is fluidly connected to the steam methane reformer 700. The steam methane reformer 700 can be embodied as any vessel or combination equipment that is configured to perform catalyzed reactions that convert methane received from hydrogen-rich methane stream 210 into carbon monoxide, carbon dioxide, and hydrogen. Steam methane reforming techniques are known in the art and generally involve the reaction of methane with steam at high temperatures (e.g., from about 700° C. to about 1100° C.), typically in the presence of a metal-based catalyst (e.g., a nickel-based catalyst), to produce carbon monoxide, carbon dioxide, and hydrogen.

Reformer product stream 710 containing carbon monoxide, carbon dioxide, and hydrogen can flow from the steam methane reformer 700 and fluidly connect to the inlet 403 of the fuel cell 400. In aspects, the reformer product stream 710 can include hydrogen in a range of from about 50 vol % to less than 100 vol %; alternatively, in a range of from about 50 vol % to about 90 vol %; alternatively, in a range of from about 90 vol % to less than 100 vol % based on a total volume of the reformer product stream 710. In aspects, the reformer product stream 710 can include carbon dioxide and carbon monoxide in a range of from about 1 vol % to about 40 vol %; alternatively, in a range of from about 10 vol % to about 40 vol %; alternatively, in a range of from about 10 vol % to about 20 vol % based on a total volume of the reformer product stream 710. In additional aspects, the reformer product stream 710 can include methane in a range of less than 5, 4, 3, 2, or 1 vol % based on a total volume of the reformer product stream 710. In aspects, the reformer product stream 710 is free of nitrogen, containing 0 vol % nitrogen or less than 1, 0.1, 0.01, 0.001 vol % nitrogen based on a total volume of the reformer product stream 710. In some aspects, the steam methane reformer 700 can be configured to convert C2+ molecules without substantial conversion of methane, and can be referred to as a steam C2+ reformer. In such aspects, the reformer product stream 710 can include: i) methane in a range of 25 to 35 vol % based on a total volume of the reformer product stream 710, ii) carbon dioxide and carbon monoxide in a range of from about 1 vol % to about 25 vol % based on a total volume of the reformer product stream 710, iii) hydrogen in a range of from about 50 vol % to less than 100 vol % based on a total volume (which can be on a water-free basis as described above) of the reformer product stream 710, and iv) free of nitrogen. Any of the concentrations for the reformer product stream 710 can be additionally on a water-free basis, meaning that any concentration of water in the reformer product stream 710 is not included in the total volume of the reformer product stream 710.

The fuel cell 400 in FIG. 4 is configured structurally similar to the fuel cell 400 described for the system 1000 in FIG. 1, for the reactions described for the fuel cell 400 in FIG. 2. The anode chamber 401 can receive the reformer product stream 710, and the cathode chamber 407 can receive the oxygen-containing stream 410. The reactions create a potential difference between the anode 402 and the cathode 404, create an electrical charge across the element 406, and generate electricity that can be conducted through electrically conducting wires 412 to the load 413.

The first fuel cell product stream 420 contains water, carbon dioxide, carbon monoxide, unreacted methane, unreacted hydrogen, or combinations thereof. In aspects, the first fuel cell product stream 420 can include carbon dioxide in a range of from about vol % to less than 100 vol %; alternatively, in a range of from about 60 vol % to about vol %; alternatively, in a range of from about 90 vol % to less than 100 vol % based on a total volume of the first fuel cell product stream 420. In aspects, the first fuel cell product stream 420 can include carbon monoxide in a range of from about 1 vol % to about 10 vol %; alternatively, in a range of from about 1 vol % to about 5 vol % based on a total volume of the first fuel cell product stream 420. In aspects, the first fuel cell product stream 420 can include unreacted methane in a range of from about 1 vol % to about 30 vol %; alternatively, in a range of from about 1 vol % to about 20 vol %; alternatively, in a range of from about 5 vol % to about 20 vol % based on a total volume of the first fuel cell product stream 420. In aspects, the first fuel cell product stream 420 can include unreacted hydrogen in a range of from about 1 vol % to about 20 vol %; alternatively, in a range of from about 1 vol % to about 15 vol %; alternatively, in a range of from about 1 vol % to about 10 vol % based on a total volume of the first fuel cell product stream 420. In additional aspects, the first fuel cell product stream 420 can include water in a range of from about 1 vol % to about 10 vol % based on a total volume of the first fuel cell product stream 420.

Unreacted oxygen and nitrogen flow from the outlet 411 of the cathode chamber 407 in the second fuel cell product stream 430 (which can also be referred to as a cathode off-gas stream). The contents of stream 430, containing primarily oxygen and nitrogen, can be recycled for use in oxygen-containing stream 410 or used in another process, for example. "Unreacted oxygen" in the second fuel cell product stream 430 refers to oxygen that is fed in fuel cell 400 and passes unreacted to the second fuel cell product stream 430.

The first fuel cell product stream 420 is fluidly connected to the carbon capture process 500. Except as noted above, the operation and embodiments of the fuel cell 400 and carbon capture process 500 in the system 4000 in FIG. 4 are the same as described for the system 1000 in FIG. 1.

A process performed with system 4000 can include separating the first cracking product stream 132 into a hydrogen-rich methane stream 210 and one or more second cracking product streams 220; introducing the hydrogen-rich methane stream 210 to a steam methane reformer 700; converting, in the steam methane reformer 700, methane to hydrogen to produce a reformer product stream 710 comprising methane and hydrogen; introducing the reformer product stream 710 to the anode chamber 401 of a fuel cell 400; introducing the oxygen-containing stream 410 to the cathode chamber 407 of the fuel cell 400, wherein the fuel cell 400 has an assembly 414 comprising the anode 402 and the cathode 404 that are separated by the element 406 (e.g., a solid oxide element or a molten carbonate element); and converting, at the anode 402 of the fuel cell 400, hydrogen and any unreacted methane received from the reformer product stream 710 to water (and optionally carbon dioxide for unreacted methane) to generate electricity. The process can also include i) heating the furnace 100 of the hydrocarbon cracking system 4000 or a furnace of another hydrocarbon cracking system with the electricity, ii) powering an electric motor of a pump or a compressor with the electricity, or iii) both i) and ii). The process can also include recovering the first fuel cell product stream 420 from the anode chamber 401 of the fuel cell 400, wherein the first fuel cell product stream 420 comprises carbon dioxide, carbon monoxide, water, unreacted methane, unreacted hydrogen, or combinations thereof. The process can also include recovering the second fuel cell product stream 430 from the cathode chamber 407 of the fuel cell 400, wherein the second fuel cell product stream 430 comprises unreacted oxygen and nitrogen. The process can also include introducing the first fuel cell product stream 420 to a carbon capture process 500, and optionally, introducing the recycle stream 510 (recovered from the carbon capture process 500) to the anode chamber 401 of the fuel cell 400. The process can include performing the carbon capture process 500 according to any embodiment disclosed herein. The process can also include cracking a hydrocarbon in the hydrocarbon cracking system 4000 to produce the first cracking product stream 132.

FIG. 5A illustrates a schematic diagram of an embodiment of the carbon capture process 500. The carbon capture process 500 in FIG. 5A includes a water separator 520 fluidly connected to a compressor 530.

The water separator 520 can be any vessel or combination of vessels configured to connect with and receive the first fuel cell product stream 420, and to separate the first fuel cell product stream 420 into a first CO2 product stream 522 and a water stream 524. In aspects, the water separator 520 can be embodied as a gravity separator in which water separates from carbon dioxide and other gases by differences in density. Water can be recovered from the bottom of the gravity separator in water stream 524, and carbon dioxide and other gases can be recovered from the top of the gravity separator in first CO2 product stream 522.

In aspects, the first CO2 product stream 522 can include carbon dioxide in a range of from about 90 vol % to about 100 vol %; alternatively, from about 95 vol % to about 99 vol %; alternatively, greater than 90, 91, 92, 93, 94, 95, 96, 97, 98, or 99 vol %, based on a total volume of the first CO2 product stream 522.

The compressor 530 is fluidly connected to and configured to receive the first CO2 product stream 522, and to compress the carbon dioxide from a first pressure to a second pressure (e.g., such as pipeline or sequestration pressure) to produce second CO2 product stream 532. In aspects, the compressor 530 can be embodied as one or more compression stages. In aspects, the compressor 530 can be driven by an electric motor which is powered at least partially by the electricity that is generated by the fuel cell 400. In additional aspects, the second CO2 product stream 532 can be sent to sequestration or to another process (e.g., for use as inert gas, reactant, coolant in a CO2 cooling loop, or combinations thereof).

A process performed with the carbon capture process 500 in FIG. 5A, which can be utilized in the process performed with any of systems 1000, 2000, 3000, and 4000, can include introducing the first fuel cell product stream 420 to the carbon capture process 500, and recovering the CO2 product stream 522 or 532 from the carbon capture process 500. Recovering the CO2 product stream 522 or 532 can include separating, in the water separator 520, the first fuel cell product stream 420 into i) the first CO2 product stream 522 comprising the carbon dioxide, and ii) the water stream 524 comprising the water; and compressing, in the compressor 530, the first CO2 product stream 522 to form a second CO2 product stream 532.

FIG. 5B illustrates a schematic diagram of another embodiment of the carbon capture process 500. The carbon capture process 500 in FIG. 5B includes a first compressor 540, the water separator 520 connected to the first compressor 540, a carbon dioxide recovery unit 550 connected to the water separator 520, and a second compressor 560 connected to the carbon dioxide recovery unit 550.

The compressor 540 is fluidly connected to and configured to receive the first fuel cell product stream 420, and to compress the contents of the first fuel cell product stream 420 from a first pressure to a second pressure (e.g., such as pressure that prepares contents for separating water in the water separator 520) to produce a first compressed stream 542. In aspects, the compressor 540 can be embodied as one or more compression stages. In aspects, the compressor 540 can be driven by an electric motor which is powered at least partially by the electricity that is generated by the fuel cell 400.

The water separator 520 can be any vessel or combination of vessels configured to connect with and receive the first compressed stream 542, and to separate the first compressed stream 542 into a first CO2 product stream 522 and a water stream 524. In aspects, the water separator 520 can be embodied as a gravity separator in which water separates from carbon dioxide and other gases by differences in density or a separator having a regenerable desiccant therein configured to absorb water while allowing carbon dioxide and other gases to pass therethrough. Water can be recovered from the bottom of the water separator 520 in water stream 524, and carbon dioxide and other gases can be recovered from the top of the gravity separator in first CO2 product stream 522.

The carbon dioxide recovery unit 550 can include equipment for absorption, adsorption, membrane separation, carbon dioxide condensation, or a combination thereof, of carbon dioxide from the first CO2 product stream 522, forming the second CO2 product stream 552 and the recycle stream 510. In aspects, carbon dioxide can be captured by passing the first CO2 product stream 522 to an absorber having an amine-based (e.g., monoethanolamine) acid gas sorbent therein (e.g., connected an absorbent regeneration loop). The sorbent absorbs the carbon dioxide while other components of the first CO2 product stream 522 (e.g., unabsorbed carbon dioxide, unreacted methane, unreacted hydrogen) bubble through the sorbent to a gas outlet of the absorber. Carbon dioxide can be recovered from the sorbent in a sorbent regenerator, and regenerated sorbent can be recirculated back to the absorber. The recovered carbon dioxide can flow from the sorbent regenerator in a second CO2 product stream 552 for storage, transport, or sequestration. Unreacted hydrogen, unreacted methane, and residual amounts of carbon dioxide that are not absorbed can flow out of the sorbent in recycle stream 510. In aspects, the second CO2 product stream 552 can include carbon dioxide in a range of from about 95 vol % to about 100 vol %; alternatively, from about 95 vol % to about 99 vol %; alternatively, greater than 95, 96, 97, 98, or 99 vol %, based on a total volume of the second CO2 product stream 552.

In aspects, the recycle stream 510 can include unreacted methane (e.g., methane being optionally present in systems 1000 and 3000), unreacted hydrogen, and carbon dioxide. In aspects, recycle stream 510 can include carbon dioxide in a range of from about 20 vol % to 60 vol %; alternatively, in a range of from about 30 vol % to about vol % based on a total volume of the recycle stream 510. In aspects, the recycle stream 510 can include unreacted methane in a range of from about 0 vol % to about 30 vol %; alternatively, in a range of from about 0 vol % to about 20 vol % based on a total volume of the recycle stream 510. In aspects, the recycle stream 510 can include unreacted hydrogen in a range of from about 1 vol % to about 20 vol %; alternatively, in a range of from about 1 vol % to about 15 vol %; alternatively, in a range of from about 1 vol % to about 10 vol % based on a total volume of the recycle stream 510.

The compressor 560 is fluidly connected to and configured to receive the second CO2 product stream 552, and to compress the carbon dioxide from a first pressure to a second pressure (e.g., such as pipeline or sequestration pressure) to produce third CO2 product stream 562. In aspects, the compressor 560 can be embodied as one or more compression stages. In aspects, the compressor 560 can be driven by an electric motor which is powered at least partially by the electricity that is generated by the fuel cell 400. In additional aspects, the third CO2 product stream 562 can be sent to sequestration or to another process (e.g., for use as inert gas, reactant, coolant in a CO2 cooling loop, or combinations thereof).

A process performed with the carbon capture process 500 in FIG. 5B, which can be utilized in the process performed with any of systems 1000, 2000, 3000, and 4000, can include introducing the first fuel cell product stream 420 to the carbon capture process 500, recovering the CO2 product stream 552 or 562 from the carbon capture process 500, optionally recovering the recycle stream 510 comprising carbon dioxide, the unreacted methane, and the unreacted hydrogen from the carbon capture process 500, and optionally introducing the recycle stream 510 to the anode chamber 401 of the fuel cell 400. The process can include compressing, in a compressor 540, the first fuel cell product stream 420 to form compressed stream 542; separating, in a water separator 520, the compressed stream 542 into i) the first CO2 product stream 522 comprising carbon dioxide, carbon monoxide, unreacted methane, unreacted hydrogen, or combinations thereof and ii) the water stream 524 comprising water. The process can also include separating, in carbon dioxide recovery unit 550, the first CO2 product stream 522 into i) a second CO2 product stream 552 comprising carbon dioxide and ii) a recycle stream 510 comprising carbon dioxide, carbon monoxide, unreacted methane, unreacted hydrogen, or combinations thereof. The process can also include introducing the recycle stream 510 to the anode chamber 401 of the fuel cell 400. The process can also include compressing the second CO2 product stream 552 in compressor 560 to form a third CO2 product stream 562. In additional aspects, the process can include sending the CO2 product stream 562 can be sent to sequestration or to another process (e.g., for use as inert gas, reactant, coolant in a CO2 cooling loop, or combinations thereof).

ADDITIONAL DESCRIPTION

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the detailed description of the present disclosure. The disclosures of all patents, patent applications, and publications cited herein are hereby incorporated by reference.

Aspects of processes and systems have been described. The following are non-limiting, specific aspects in accordance with the present disclosure:

Aspect 1. A process comprising: separating a first cracking product stream into a hydrogen-rich methane stream and one or more second cracking product streams; introducing the hydrogen-rich methane stream or a derivative product stream to an anode chamber of a fuel cell; introducing an oxygen-containing stream to a cathode chamber of the fuel cell, wherein the fuel cell has an assembly comprising an anode and a cathode that are separated by a separating element; and converting, at the anode of the fuel cell, methane and hydrogen received from the hydrogen-rich methane stream or from the methane product stream to carbon dioxide and water to generate electricity.

Aspect 2. The process of Aspect 1, further comprising: heating a hydrocarbon cracking system with the electricity.

Aspect 3. The process of Aspect 1 or 2, further comprising: powering an electric motor of a pump or a compressor with the electricity.

Aspect 4. The process of any of Aspects 1 to 3, wherein the derivative product stream is introduced to the anode chamber of the fuel cell.

Aspect 5. The process of any of Aspects 1 to 4, further comprising: separating the hydrogen-rich methane stream into a hydrogen product stream and a methane product stream.

Aspect 6. The process of Aspect 5, wherein the methane product stream is the derivative product stream.

Aspect 7. The process of any of Aspects 5 to 6, further comprising: introducing the methane product stream to a steam methane reformer; and converting the methane to hydrogen in the steam methane reformer to produce a reformer product stream, wherein the reformer product stream is the derivative product stream.

Aspect 8. The process of any of Aspects 5 to 7, further comprising: introducing the hydrogen product stream to a furnace of a hydrocarbon cracking system, the process further comprising: cracking a hydrocarbon in the hydrocarbon cracking system to produce the first cracking product stream by combusting the hydrogen product stream in the furnace of the hydrocarbon cracking system.

Aspect 9. The process of Aspect 1, wherein the hydrogen-rich methane stream is introduced to the anode chamber of the fuel cell.

Aspect 10. The process of Aspect 9, further comprising: cracking a hydrocarbon in a hydrocarbon cracking system to produce the first cracking product stream.

Aspect 11. The process of Aspect 1, wherein the derivative product stream is introduced to the anode chamber of the fuel cell.

Aspect 12. The process of Aspect 11, further comprising: introducing the hydrogen-rich methane stream to a steam methane reformer; and converting methane to hydrogen in the steam methane reformer to produce a reformer product stream, wherein the reformer product stream is the derivative product stream.

Aspect 13. The process of any of Aspects 1 to 12, further comprising: recovering a first fuel cell product stream from the anode chamber of the fuel cell, wherein the first fuel cell product stream comprises the carbon dioxide, the water, unreacted methane, and unreacted hydrogen; recovering a second fuel cell product stream from the cathode chamber of the fuel cell, wherein the second fuel cell product stream comprises unreacted oxygen and nitrogen; or both.

Aspect 14. The process of Aspect 13, further comprising: introducing the first fuel cell product stream to a carbon capture process.

Aspect 15. The process of Aspect 14, further comprising: recovering a recycle stream comprising carbon dioxide, carbon dioxide, unreacted methane, and unreacted hydrogen, or combinations thereof from the carbon capture process; and introducing the recycle stream to the anode chamber of the fuel cell.

Aspect 16. The process of any of Aspects 1 to 15, wherein no nitrogen is present in the anode chamber of the fuel cell.

Aspect 17. The process of any of Aspects 1 to 16, wherein the separating element comprises a solid oxide element or a molten carbonate element.

Aspect 18. A hydrocarbon cracking system including: a furnace having a conduit contained in an interior of the furnace; a first separator fluidly connected to an outlet of the conduit and configured to separate a first cracking product stream into a hydrogen-rich methane stream and one or more second first cracking product stream; a second separator fluidly connected to the first separator and configured to separate the hydrogen-rich methane stream into a hydrogen product stream and a methane product stream; a fuel cell having an anode chamber, a cathode chamber, and an assembly comprising i) an anode, ii) a cathode, and iii) a separating element positioned between the anode and the cathode, wherein an inlet to the anode chamber is configured to receive the methane product stream, wherein the fuel cell is configured to convert, at the anode of the fuel cell, methane and hydrogen received from the methane product stream or a derivative product stream to carbon dioxide and water to generate electricity.

Aspect 19. The system of Aspect 18, wherein the fuel cell is configured to receive the derivative product stream, the system further comprising: a steam methane reformer fluidly connected to the second separator and to the anode chamber of the fuel cell, wherein the steam methane reformer is configured to receive the methane product stream, to convert methane to hydrogen, and to produce a reformer product stream, wherein the derivative product stream is the reformer product stream.

Aspect 20. The system of any of aspects 18 to 19, further comprising: a third separator fluidly coupled to an outlet of the anode of the fuel cell and configured to separate a fuel cell product stream received from the anode of the fuel cell into i) a first CO2 product stream comprising the carbon dioxide, unreacted methane, and unreacted hydrogen, and ii) a water stream comprising the water.

Aspect 21. The system of Aspect 20, further comprising: a fourth separator fluidly coupled to the third separator and configured to separate the first CO2 product stream into i) a second CO2 product stream comprising a first portion of the carbon dioxide and ii) a recycle stream comprising a second portion of the carbon dioxide, the unreacted methane, and the unreacted hydrogen, optionally wherein the recycle stream is fluidly connected to the anode of the fuel cell.

Aspect 22. The system of any of Aspects 18 to 21, wherein the separating element comprises a solid oxide element or a molten carbonate element.

Aspect 23. A hydrocarbon cracking system including: a furnace having a conduit contained in an interior of the furnace; a first separator fluidly connected to an outlet of the conduit and configured to separate a first cracking product stream into a hydrogen-rich methane stream and a second first cracking product stream; a fuel cell having an anode chamber, a cathode chamber, and an assembly comprising i) an anode, ii) a cathode, and iii) a separating element positioned between the anode and the cathode, wherein an inlet to the anode chamber is configured to receive the hydrogen-rich methane stream, wherein the fuel cell is configured to convert, at the anode of the fuel cell, methane and hydrogen received from the hydrogen-rich methane stream or a derivative product stream to carbon dioxide and water to generate electricity.

Aspect 24. The system of Aspect 23, wherein the fuel cell is configured to receive the derivative product stream, the system further comprising: a steam methane reformer fluidly connected to the first separator and to the anode chamber of the fuel cell, wherein the steam methane reformer is configured to receive the hydrogen-rich methane stream, to convert methane to hydrogen, and to produce a reformer product stream, wherein the derivative product stream is the reformer product stream.

Aspect 25. The system of Aspect 23 or 24, further comprising: a second separator fluidly coupled to an outlet of the anode of the fuel cell and configured to separate a fuel cell product stream received from the anode of the fuel cell into i) a first CO2 product stream comprising the carbon dioxide, unreacted methane, and unreacted hydrogen, and ii) a water stream comprising the water.

Aspect 26. The system of Aspect 25, further comprising: a third separator fluidly coupled to the second separator and configured to separate the first CO2 product stream into i) a second CO2 product stream comprising a first portion of the carbon dioxide and ii) a recycle stream comprising a second portion of the carbon dioxide, the unreacted methane, and the unreacted hydrogen.

Aspect 27. The system of any of Aspects 23 to 26, wherein the separating element comprises a solid oxide element or a molten carbonate element.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A process comprising:
    separating a first cracking product stream into a hydrogen-rich methane stream and one or more second cracking product streams;
    introducing the hydrogen-rich methane stream or a derivative product stream to an anode chamber of a fuel cell;
    introducing an oxygen-containing stream to a cathode chamber of the fuel cell, wherein the fuel cell has an assembly comprising an anode and a cathode that are separated by a separating element; and
    converting, at the anode of the fuel cell, methane and hydrogen received from the hydrogen-rich methane stream or from the derivative product stream to carbon dioxide and water to generate electricity,
    wherein no nitrogen is present in the anode chamber of the fuel cell.

2. The process of claim 1, further comprising:
    heating a hydrocarbon cracking system with the electricity.

3. The process of claim 1, further comprising:
    powering an electric motor of a pump or a compressor with the electricity.

4. The process of claim 1, wherein the derivative product stream is introduced to the anode chamber of the fuel cell.

5. The process of claim 4, further comprising:
    separating the hydrogen-rich methane stream into a hydrogen product stream and a methane product stream.

6. The process of claim 5, wherein the methane product stream is the derivative product stream.

7. The process of claim 5, further comprising:
    introducing the methane product stream to a steam methane reformer; and
    converting the methane to hydrogen in the steam methane reformer to produce a reformer product stream,
    wherein the reformer product stream is the derivative product stream.

8. The process of claim 5, further comprising:
    introducing the hydrogen product stream to a furnace of a hydrocarbon cracking system, the process further comprising:
    cracking a hydrocarbon in the hydrocarbon cracking system to produce the first cracking product stream by combusting the hydrogen product stream in the furnace of the hydrocarbon cracking system.

9. The process of claim 1, wherein the hydrogen-rich methane stream is introduced to the anode chamber of the fuel cell, the process further comprising:

cracking a hydrocarbon in a hydrocarbon cracking system to produce the first cracking product stream.

10. The process of claim 1, wherein the derivative product stream is introduced to the anode chamber of the fuel cell, the process further comprising:

introducing the hydrogen-rich methane stream to a steam methane reformer; and converting methane to hydrogen in the steam methane reformer to produce a reformer product stream, wherein the reformer product stream is the derivative product stream.

11. The process of claim 1, further comprising:

recovering a first fuel cell product stream from the anode chamber of the fuel cell, wherein the first fuel cell product stream comprises the carbon dioxide, the water, unreacted methane, and unreacted hydrogen; and recovering a second fuel cell product stream from the cathode chamber of the fuel cell, wherein the second fuel cell product stream comprises unreacted oxygen and nitrogen.

12. The process of claim 11, further comprising:

introducing the first fuel cell product stream to a carbon capture process;

recovering a recycle stream comprising carbon dioxide, carbon monoxide, unreacted methane, unreacted hydrogen, or combinations thereof from the carbon capture process; and introducing the recycle stream to the anode chamber of the fuel cell.

13. The process of claim 1, wherein the separating element comprises a solid oxide element or a molten carbonate element.

* * * * *